US009805120B2

(12) United States Patent
Tawfik et al.

(10) Patent No.: US 9,805,120 B2
(45) Date of Patent: Oct. 31, 2017

(54) QUERY SELECTION AND RESULTS MERGING

(71) Applicant: Microsoft Technology Licensing, LLC, Redmond, WA (US)

(72) Inventors: Ahmed Yassin Tawfik, Giza (EG); Ahmed Sobhi Mohamed Kamel, Cairo (EG); Kenneth Chi-Heng Lo, Toronto (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 323 days.

(21) Appl. No.: 14/180,982

(22) Filed: Feb. 14, 2014

(65) Prior Publication Data

US 2015/0234920 A1 Aug. 20, 2015

(51) Int. Cl.
*G06F 17/30* (2006.01)
*G06F 17/28* (2006.01)
*G06F 17/27* (2006.01)

(52) U.S. Cl.
CPC .... *G06F 17/30864* (2013.01); *G06F 17/3053* (2013.01); *G06F 17/30669* (2013.01); *G06F 17/30867* (2013.01); *G06F 17/275* (2013.01); *G06F 17/289* (2013.01); *G06F 17/3043* (2013.01)

(58) Field of Classification Search
CPC ......... G06F 17/30867; G06F 17/30864; G06F 17/289; G06F 17/30669; G06F 17/3053; G06F 17/275; G06F 17/28; G06F 17/3043

USPC ................ 707/748, 722, 723, 724, 729, 760
See application file for complete search history.

(56) References Cited

U.S. PATENT DOCUMENTS 7,523,108 B2 * 4/2009 Cao ................... G06F 17/30241
707/999.005
7,774,348 B2 8/2010 Delli Santi et al.
(Continued)

OTHER PUBLICATIONS

Chang, et al., "Detecting Multilingual and Multi-Regional Query Intent in Web Search", in Proceedings of the Twenty-Fifth Association for the Advancement of Artificial Intelligence, Aug. 2011, 6 pages.

(Continued)

*Primary Examiner* — Dangelino Gortayo

(57) ABSTRACT

Multilingual/cross-region search result merging is described. In various examples, a user enters a query to an information retrieval system and receives search results appropriate to different combinations of human language and geographical region, and where the combinations are selected according to features describing intent of the query. In examples, query intent features are computed using a query understanding component (e.g. a trained query intent classifier) and used, optionally with other query features, to identify combinations of human language and geographical region from a stored profile. In examples the stored profile is computed using data about documents available to an information retrieval system and data about past search behavior. In examples, different combinations of language and region are used to retrieve search results which are merged. For example, a query is translated into another language while preserving calculated intent features of the query.

20 Claims, 5 Drawing Sheets

(56) References Cited

U.S. PATENT DOCUMENTS

| | | | | | |
|---|---|---|---|---|---|
| 8,442,830 | B2* | 5/2013 | Nakajima | ............ | G10L 15/183 704/257 |
| 8,498,974 | B1* | 7/2013 | Kim | ................. | G06F 17/30867 707/706 |
| 8,515,934 | B1* | 8/2013 | Shaw | ............... | G06F 17/30669 707/706 |
| 8,799,307 | B2* | 8/2014 | Chin | ................. | G06F 17/30864 707/760 |
| 8,868,548 | B2* | 10/2014 | Kurzion | ........... | G06F 17/30867 707/723 |
| 8,874,599 | B2* | 10/2014 | Murphy | ........... | G06F 17/30401 707/760 |
| 8,938,463 | B1* | 1/2015 | Kim | ................. | G06F 17/30867 707/751 |
| 8,959,093 | B1* | 2/2015 | Nerurkar | .......... | G06F 17/30867 707/706 |
| 8,972,394 | B1* | 3/2015 | Tong | ................... | G06F 17/3071 707/728 |
| 9,164,987 | B2* | 10/2015 | Chen | ................ | G06F 17/30864 |
| 9,183,311 | B2* | 11/2015 | Tong | ................... | G06F 17/3071 707/728 |
| 2009/0112845 | A1* | 4/2009 | Byers | ............... | G06F 17/30696 707/999.005 |
| 2009/0307198 | A1 | 12/2009 | Zhang et al. | | |

OTHER PUBLICATIONS

Ghorab, et al., "Multilingual Adaptive Search for Digital Libraries", in Proceedings of the 15th International Conference on Theory and Practice of Digital Libraries: Research and Advanced Technology for Digital Libraries, Sep. 26, 2011, 8 pages.

Parton, et al., "Combining Signals for Cross-Lingual Relevance Feedback", in the Eighth Asia Information Retrieval Societies Conference, Dec. 2012, 10 pages.

* cited by examiner

|  | Original Query ⏜ 300 | | | Further Pairs ⏜ 302 | |
| --- | --- | --- | --- | --- | --- |
| Language | Region | Intent category | | Language | Region |
| FR | Quebec | Entertainment | | FR | FR |
| ES | Miami | Entertainment | | EN | US |
|  |  |  | | ES | US |
|  |  |  | | ES | MX |
| FR | Wallonia | Entertainment | | FR | FR |
| FR | Wallonia | Politics | | NL | Flanders |
| AR | Egypt | Luxury Products | | AR | KW |
|  |  |  | | AR | QA |
| AR | Egypt | Medicine | | EN | US |

FIG. 3

< 1. English result >

< 2. English result >

< 3. English result >

< 4. Spanish result >    ～ 402

< 5. Spanish result >    ～ 402

< 6. English result >

< 7. Spanish result >    ～ 402

QUERY SELECTION AND RESULTS MERGING

BACKGROUND

A web search query tends to have the most relevant results when the retrieval matches the user's language and takes into account her physical location. Therefore, it is common for search engines to use a language-market or language-region pair that matches closely the query language and location. Typically, a search engine only returns (i.e. ranks on top positions) those search results having the same language as the query and the query results that are from within the same region in which the user of the query is located. However, for a class of queries, search results and their relevance can be improved by leveraging results from other language-region pairs. This is particularly true for content poor languages whose total content may be minute compared to global web contents.

This is also true for countries where multiple languages are spoken, such as the United States, Canada, Belgium and Switzerland. In the U.S., for example, studies have shown that bi-lingual users are on the rise which blurs the line between primary and secondary languages. Also in Egypt, many people speak English beside Arabic.

However, routinely issuing queries to multiple languages and/or regions in order to improve the relevance of the search results introduces significant processing delays and overheads.

The embodiments described below are not limited to implementations which solve any or all of the problems mentioned above.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Multilingual and cross-region search result merging is described in multilingual/cross region search. In various examples, a user enters a query to an information retrieval system and receives search results appropriate to different combinations of human language and geographical region, and where the combinations are selected according to features describing intent of the query. In examples, query intent features are computed using query understanding techniques (for example, a trained query intent classifier or a projection to a semantic space) and used, optionally with other query features, to identify combinations of human language and geographical region from a stored profile. In examples the stored profile is computed using data about documents available to an information retrieval system and data about past search behavior to assess the quality and quantity of content related to each intent per language-region pair. In examples, different combinations of language and region are used to retrieve search results which are merged. For example, a query is translated into another language whilst preserving calculated intent features of the query.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 3 illustrates a predetermined intent-based content profile;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented as part of an information retrieval system, the system described is provided as an example and not a limitation. As those skilled in the art will appreciate, the present examples are suitable for application in a variety of different types of computing systems.

While search results for some queries entered in a web search engine improve when the query is issued to another language and/or region, other queries—albeit consuming computational resources—do not profit therefrom. Hence, it is proposed to extract features from the query such as the language of the query, the region of the user and the intent (purpose) of the query. Subsequently, the (original) search results in the language of the query and for the region of the user are retrieved/obtained. It is subsequently or concurrently (in order to save time and to accelerate the method) determined whether search results in another language and/or for another region should be obtained for this particular query. To this end, the features extracted from the query and a predetermined intent-based content profile are taken into account. If it is determined that search results in another language and/or for another region should be obtained for the particular query, the corresponding search results are received. These search results are merged with the original search results to send them to end user equipment to present them to the user in an appropriate order. If the query has not been selected for a multilingual/cross region search, the original search results are presented to the user. Furthermore, the user does not have to manually translate its query into another language to receive additional search results in the other language. All relevant search results are output in response to the user entering one search query.

Figure 1:
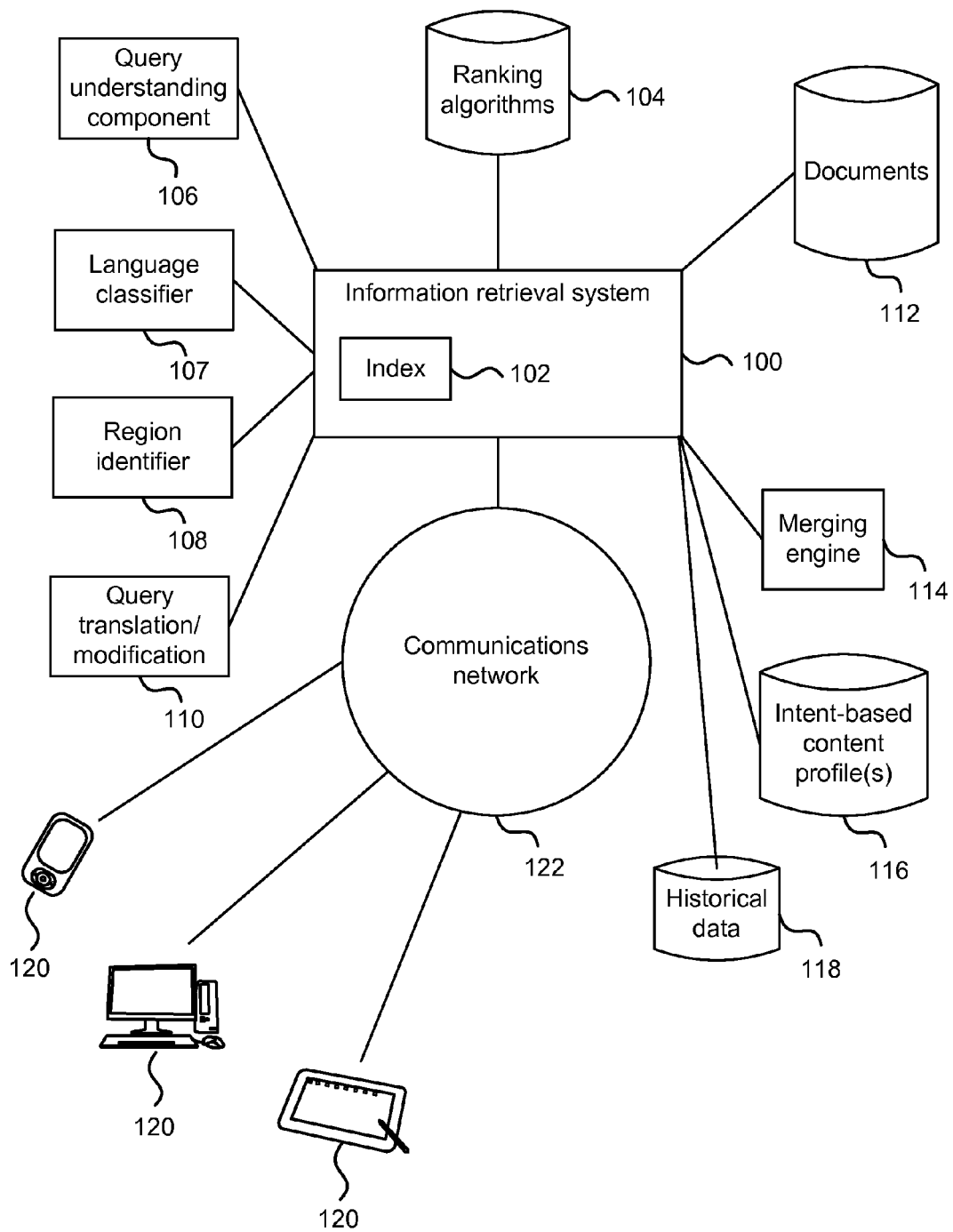
FIG. 1 illustrates an information retrieval system in which a method of selecting a query for multilingual/cross region search and merging the results is performed.

FIG. 1 illustrates an information retrieval system in which a method for selecting queries for multilingual/cross region search and merging the results is performed. Before proceeding further with the detailed description of FIG. 1, however, a few items of embodiments will be discussed.

According to one aspect, upon receiving a query, features are extracted from the query. The features include language of the query, region of a user, and intent of the query. Search results for the query with regard to the language of the query and the region of the user are returned. It is also determined whether the query would benefit from issuing it to another language-region pair based at least in part on a predetermined intent-based content profile and the features extracted from the query. In response to determining that the query would benefit from issuing it to another language-region pair, the search results for another language-region pair are received. Then, the search results for the original language-region pair are merged with the search results for the other language-region pair. Finally, the merged search results are sent to end user equipment. Or, if it has been determined that the query would not benefit from issuing it to another language-region pair, the search results for the original language-region pair are output to the end user.

A web search engine, as an example of an information retrieval system, is a software system that is designed to search for information on the World Wide Web. The search results are generally presented in the form of snippets which represent extracts of the found search result pages. Unlike web directories, which are maintained only by human editors, search engines also maintain real-time information by running an algorithm on a web crawler. A search engine operates in the following order: web crawling, indexing and searching.

Web search engines work by storing information about many web pages, which they retrieve from the HTML markup of the pages. These pages are retrieved by a web crawler which is a software system that systematically browses the web, typically for the purpose of web indexing.

The search engine then analyzes the contents of each page to determine how it should be indexed (for example, words can be extracted from the titles, page content, headings, or special fields called meta tags). Data about web pages are stored in an index for use in later queries. A query from a user may be a single word. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text (snippets). The index is built from the information stored with the data and the method by which the information is indexed. The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

The term "intent of a query" as used herein refers to asking the question what it is exactly the user is asking for. This question is especially hard to answer when search terms have multiple meanings. Therefore, search engines need as much contextual information as possible to help them figure out the specific meaning of the content. Language and location are also key in determining the intent of a query. This is due to the fact that the meaning of words can vary greatly depending on both factors. An example is the search term "football", which would refer to American football in the United States, but would refer to soccer in most other places in the world. The intent of a query can be classified in the form of (alphabetic) categories, such as "Academic, Art, Auto, Banking, Celebrity, Commerce, Computers & Technology, Culture, Employment, . . . , Vocabulary, Weather, Web". For example, if the user enters "doors" and it can be determined that his intent belongs to the category "Music" and not to the category "Home Renovation", then it can be assumed that the user wants to get information about the US rockband "The Doors" and not any information about where he can buy doors.

A query is entered by a user in a web interface. In order to determine the location of the user, a reverse IP lookup may be made. Pairing of IP address to a geographical location is called geolocation which is used to determine the location of the user asking the query. Although it may be interesting to be able to find precise location of a user (at a host computer) asking a query, it is almost impossible to find exact location of a host computer given its IP address. However, there are tools available to help identify approximate location of the host computer. Accuracy of geolocation database varies depending on which database is used. For IP-to-country database, some vendors offer 98% to 99% accuracy although typical Ip2Country database accuracy is more like 95%. For IP-to-Region (or City), accuracy ranges anywhere from 50% to 75% if neighbouring cities are treated as correct. Thereby, the "region" (in some contexts also referred to as "market") in which a user is located may be determined. The term "region" as used herein may refer to a country, but may also refer to a cultural, economic or political part of a country. For example, Quebec is considered to be a region, because French is spoken there in contrast to the rest of Canada. Miami is also considered to be a region because, although located in the US, it has a high number of immigrants coming from Latin America who speak Spanish (and English). Similar situations are in Wallonia which is the French speaking region of Belgium and Romandy which is the French speaking region of Switzerland. Quebec, Wallonia and Romandy are culturally tied to France. For example, there is a high likelihood that a French movie shown in cinemas in France is also shown in Quebec.

In some of the embodiments, receiving search results for the original language-region pair includes issuing the query to a ranker for the original language-region pair. The result corresponds to the search result pages that are normally obtained by a search engine since it is known that—in general—good search results are obtained by using a ranker that is specialized for the original language-region pair of the query. A ranker is a software that ranks search results using the index by applying a criterion. A FR-FR ranker for example gives search result pages written in French from France a high ranking so that they are placed in top positions when the search result pages are returned.

In some of the embodiments, receiving search results for another language-region pair further includes selecting another language-region pair and (re-)issuing the query to (a ranker for) the other language-region pair.

In some of the embodiments, after the other language-region pair has been selected, a new query is formulated in the other language. When translating a query, it may not be sufficient to literally translate the individual words entered in the search mask one after the other since the intent of the query needs to be preserved in order to avoid inappropriate query translations due to linguistic ambiguities. Hence, in some of the embodiments, the query will be altered into a new query before it is re-issued to another language-region pair.

In some of the embodiments, the determination whether the query would benefit from issuing it to another language-region pair is based on an analysis of signals to determine whether the probability of a user wanting the result from a given language-region pair is high. To this end, a user's click through rates and in particular the language of web pages the user visits may be analysed with appropriate consent of the user. Thereby, a linguistic profile of the user may be obtained. If it is determined that the user visits Spanish pages, it may be assumed that the user will accept search results from Spain although he entered his query in English.

In some of the embodiments, a predetermined intent-based content profile is available which indicates for a given language-region pair and a given intent at least a further language-region pair providing relevant content for the query. For example, if the query was asked in French from someone in Quebec and the intent of the query is classified as "French Movie", then the predetermined intent-based content profile indicates that it is recommendable to issue this query also to a FR-FR ranker which is specialised in finding search result pages written in French from France. To be precise, this ranker would give search results in French from France a high rank, i.e. search results in French from France would be presented at top of the list of all returned search result pages.

In some of the embodiments, determining whether the query would benefit from re-issuing it another language-region pair depends at least in part on whether the language of the query is a content poor language regarding the intent of the query. For example, if a query is asked by someone in Egypt in Arabic about a medical topic, then there will not be as many relevant search results in Arabic as in English. Since it is known, that the EN-US ranker will find a lot of relevant search results for this query, the query would be selected for a multilingual/cross region search and would be issued to the EN-US ranker.

In some of the embodiments, the extracted features are query and/or user related features. In some of the embodiments, the extracted features comprise the domain of the query, while in other embodiments, the extracted features comprise the linguistic profile of the user which indicates for example the languages that a user is able to speak and/or understand and may be obtained by analysing the web pages the user visits or from browser settings, if the user consents to it. In some of the embodiments, the location of a user may also be deduced by the location settings that a user manually enters in a settings page of an information retrieval system.

In some of the embodiments, the language of the query and intent of the query are determined by query understanding techniques (e.g. classifiers, semantic projection techniques, etc.) while the user region is determined by a reverse IP lookup as explained above. In some of the embodiments, GPS localization techniques are employed to determine the location of a user (his computer equipment) if the user consents to it.

In machine learning and statistics, classification is the problem of identifying to which of a set of categories a new observation belongs, on the basis of a training set of data containing observations (or instances) whose category membership is known. An algorithm that implements classification, especially in a concrete implementation, is known as a classifier. The term "classifier" may also refer to the mathematical function, implemented by a classification algorithm, that maps input data to a category. In the terminology of machine learning, classification may be considered an instance of supervised learning, i.e. learning where a training set of correctly identified observations is available. In some of the embodiments, the query is analyzed and its intent is classified into the categories mentioned above, while its language is classified into categories such as EN, FR, ES, etc.

In some of the embodiments, the ranker for the original language-region pair is trained on the original language-region pair to rank search results, while the ranker for the other language-region pair is trained on the other language-region pair to rank search results. In other embodiments, a global ranker is used that takes into account region and language as signals in ranking search results. In some of the embodiments, a ranker is trained by search results ranked by a human being. Again, this is a form of supervised learning. In some of the embodiments, pages are ranked and scored using document features, query features and relationships between the query and the page.

Subsequently, the search results for the original language-region pair are merged with the search results for the other language-region pair. This task is performed by a merger which is a software that is specialised in merging two or more lists of ordered search results, possibly in different languages, into a common ordered list of search results. In some of the embodiments, this merging is performed based on a learned probabilistic model that estimates a relevance gain from inserting a ranked result. The merger estimates the probability of improving result relevance if inserting a result from the other language or region given some query features such as the intent (or domain) of the query, the other candidate language-region pairs, the expected quality of translation, and correctness of the spelling of the query, among others.

In some of the embodiments, when the merged search results are presented to the user, the user is given the possibility to have a machine translation of the search results into the original language of the user. That means that if a search result page is returned to the user, which is not in the language of the original language of the query, the user may click on a button that provides him with a translation of the search result page. The search result pages are not automatically translated since the user may be bilingual and may want to read the search result page in its original language.

Returning now to FIG. 1 which shows a schematic diagram of an information retrieval system 100 in which a method for selecting a query for multilingual/cross region search and merging the results is performed. The information retrieval system 100 has, for example a web search engine, which has an index 102. The information retrieval system 100 analyzes the contents of each page to determine how it should be indexed (for example, words can be extracted from the titles, page content, headings, or special fields called meta tags). Data about web pages are stored in the index database 102 for use in later queries. The index 102 helps find information relating to the query as quickly as possible. The information retrieval system 100 is coupled to (or has) a query understanding component 106 that is able to determine an intent of a query. Furthermore, a language classifier 107 is provided within the information retrieval system 100 which is able to determine the original language of the query. A region identifier 108 is able to determine the region where the user is located who asked the query. Moreover, the information retrieval system 100 is able to translate or modify incoming queries by a query translation/modification component 110 which is able to alter a query whilst preserving its intent.

The information retrieval system 100 is further able to rank search results by means of different ranking algorithms 104. In the example shown, each ranking algorithm 104 is trained for a particular language-region pair. For example, an EN-US ranker assigns documents written in English from the United States that match the query a higher rank than documents written in any other language and/or from any other country. The information retrieval system 100 is further coupled to a document storage 112 for storing web pages downloaded by a web crawler. The web crawler copies all the pages it visits into the document storage 112 for later processing such as indexing the downloaded pages so that users can search them much more quickly.

The information retrieval system 102 is further coupled to a merging engine 114 which allows to merge the search results retrieved by different ranking algorithms 104 into one order. In order to determine whether a query may be selected for issuing it to a different ranker in addition to a ranker for its original language-region pair, one or more intent-based content profile(s) 116 are provided which indicate for particular combinations of language of the query, region of the user asking the query and intent of the query, one or more language-region pairs (rankers for language-region pairs) to which the query may be issued in order to improve the search results. The information retrieval system 100 is further coupled to a storage for historical data 118 which may indicate, for example, which web pages have already been visited by a user in order to infer whether the user is likely to accept search results in a language different from the language of the original query.

The user enters a query by means of end user equipment 120 such as a smart phone, a personal computer or a tablet computer. This equipment 120 is coupled to the information retrieval system 100 by a communications network 122 such as the Internet. The search results are sent back from the information retrieval system 100 to the end user equipment 120 where the user may see snippets of the web pages found for the query.

Figure 2:
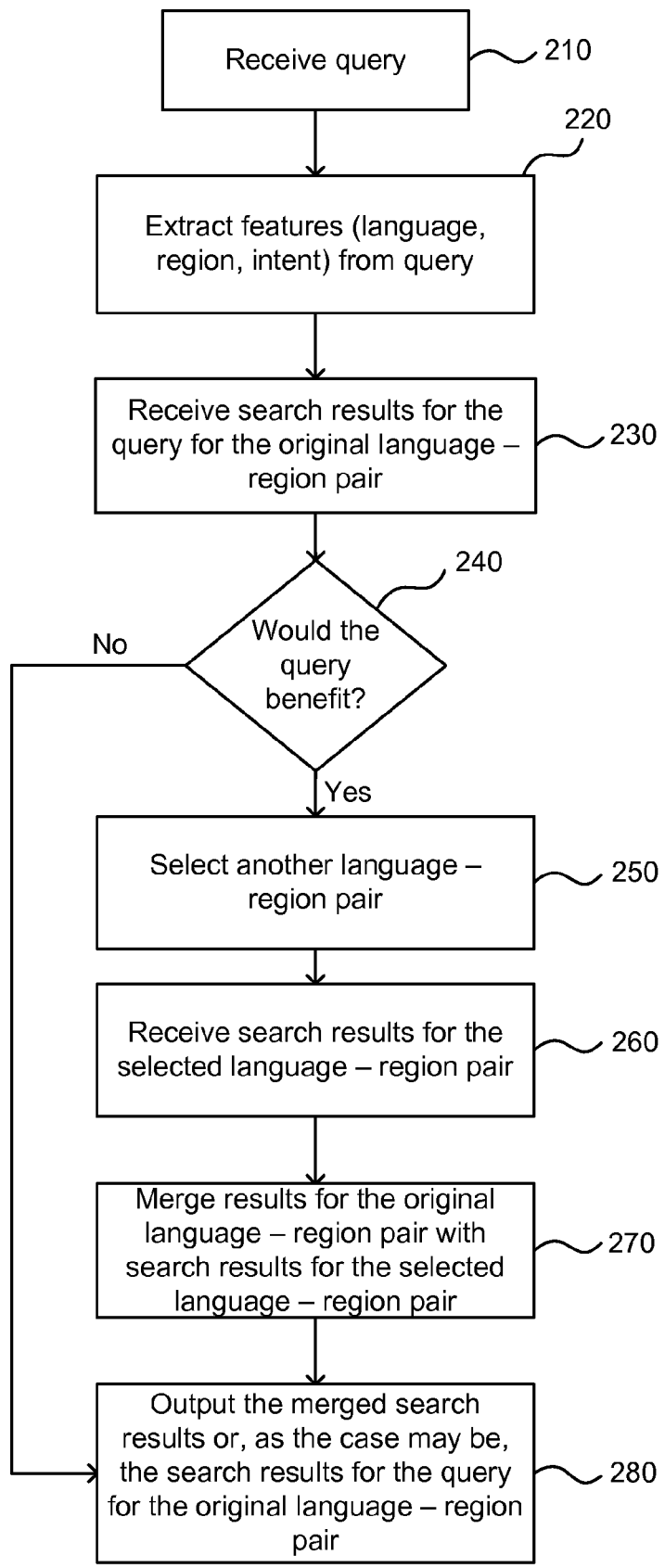
FIG. 2 illustrates a method of selecting a query for multilingual/cross region search and merging the results.

FIG. 2 shows a flow diagram of a method as part of the information retrieval system 100 of selecting a query for performing a multilingual/cross region search and merging the search results. At 210, a query is received which has been entered by a user at his end user equipment 120. Features such as the language of the query, the region where the query was asked and the intent of the query are extracted from the query at 220 or are obtained using the query. The language of the query and the region of the user establish an original language-region pair. At 230, search results for the query for the original language-region pair are received. At 240, it is determined whether the query is selected for a multilingual/cross region search by looking into the predetermined (pre-computed) intent-based language profile(s) 116. The two latter steps may be performed one after the other or concurrently. To compute the profiles automatically, document understanding techniques determine the domain (intent) of each page as well as its regional affinity. Document classification is a form of document understanding that uses the distribution of domain-specific vocabulary in identifying a document intent. Regional affinity is determined by a combination of factors including the geographic origin of click patterns on the document, the URL, the site registration information, the content, and to a lesser degree where it is hosted. If it is determined that the query is not selected for multilingual/cross region search, then the search results with regard to the original language-region pair are output to an end user's equipment 120 at 280. If, however, it is determined that the query would benefit from issuing it to another language-region pair, then another language-region pair is selected at 250. The query is re-issued to a ranker for the other language-region pair and the search results are received for the selected language region pair at 260. At 270, the search results for the original language-region pair are merged with the search results for the selected language-region pair and the merged search results are finally sent to the end user equipment for presenting them to the user at 280.

FIG. 3 illustrates an intent-based predetermined content profile 116 which allows to determine whether a query is to be selected for multilingual/cross region search. This content profile 116 is determined offline by analyzing contents in various languages and regions to identify areas of content strength. The first three columns indicate the language of the original query 300, the region of the user and the intent of the query—the features that have been extracted from the query. The fourth and the fifth columns indicate to which further rankers for language-region pairs 302 the query may be issued.

In the first line, it is referred to a query in French from Quebec which deals with "Entertainment". For such a query, the predetermined content profile 116 indicates that the query may be issued to a FR-FR ranker since this ranker will also likely find relevant content that may be interesting for the user asking the query such that the (computational) effort of issuing the query to another ranker is justified. The reason for this is that the market for entertainment, such as French movies, includes France and Quebec.

The second line refers to a query in Spanish from Miami which also has "Entertainment" as intent. According to the predetermined content profile, this query may be issued to the following rankers EN-US, ES-US, ES-MX. Since the query is in Spanish but comes from the US, it is likely that the user will speak English and that a ranker that is specialized in finding English search results from the US can contribute to the search. Also Spanish results from the US and Spanish results from Mexico are likely to improve the search results.

The third line refers to a query in French coming from Wallonia and deals with entertainment. For this case, the content profile recommends to use a FR-FR ranker which will return additional search results since Wallonia is geographically and culturally close to France.

The fourth line refers to a query in French coming from Wallonia deals with the political system of Belgium. In this case, a ranker is used which is specialized in finding Dutch results coming from Flanders. Since there are not only a lot of French web pages which deal with the political system in Belgium but also Dutch web pages from Flanders that deal with that topic, additionally using an NL-Flanders ranker may improve the search results.

The fifth line refers to a query in Arabic from Egypt which deals with luxury products. For this case, Arabic search results from Kuwait and Quatar may also be taken into account since an analysis of contents in the pan-Arabic market has shown that a lot of luxury products are offered in these countries due to their economic prosperity.

The sixth line refers to a question in Arabic from Egypt that deals with a medical topic. It has been found that the EN-US ranker delivers good search results for this intent category while the Arabic language in general offers much less web pages regarding this topic. Therefore, the query may additionally be issued to the EN-US ranker in order to improve the search results. For this case, one may also take into account to issue the query to additional English rankers such as EN-UK, EN-AUS, etc.

Queries with combinations of language, region and intent for which the content profile does not indicate any further language-region pair are not selected for a multilingual/cross region search. In these cases, the search results in the language of the query and for the region of the user are presented to the user.

Figure 4:
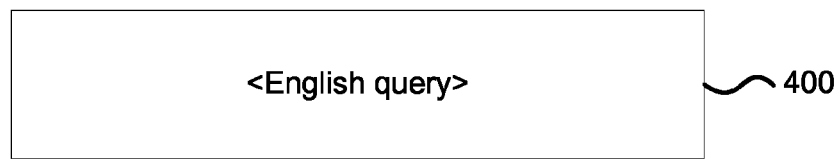
FIG. 4 illustrates an embodiment in which the user has the possibility to obtain a translation of search results that are not in the language of the query entered by the user.
Figure 4:
Figure 4:
Figure 4:

FIG. 4 schematically illustrates how the merged search result pages for a multilingual search are presented to the user via a user interface. At the top of the page is the field where the user enters his query 400 in English. Below, the search results are shown in the form of snippets in the order of their relevance for the query. The top three search results refer to English search results, while the fourth and fifth search results refer to Spanish web pages. The sixth search result is an English web page, the seventh web page again refers to a Spanish web page. While all search results are displayed in their original language, the user interface offers the user the possibility to press one of buttons 402 obtain a machine translation for the Spanish search result pages. This allows the user to read the search result pages in their original language if he is bilingual but also to read the Spanish search result pages in English if the user is unable to understand Spanish.

Figure 5:
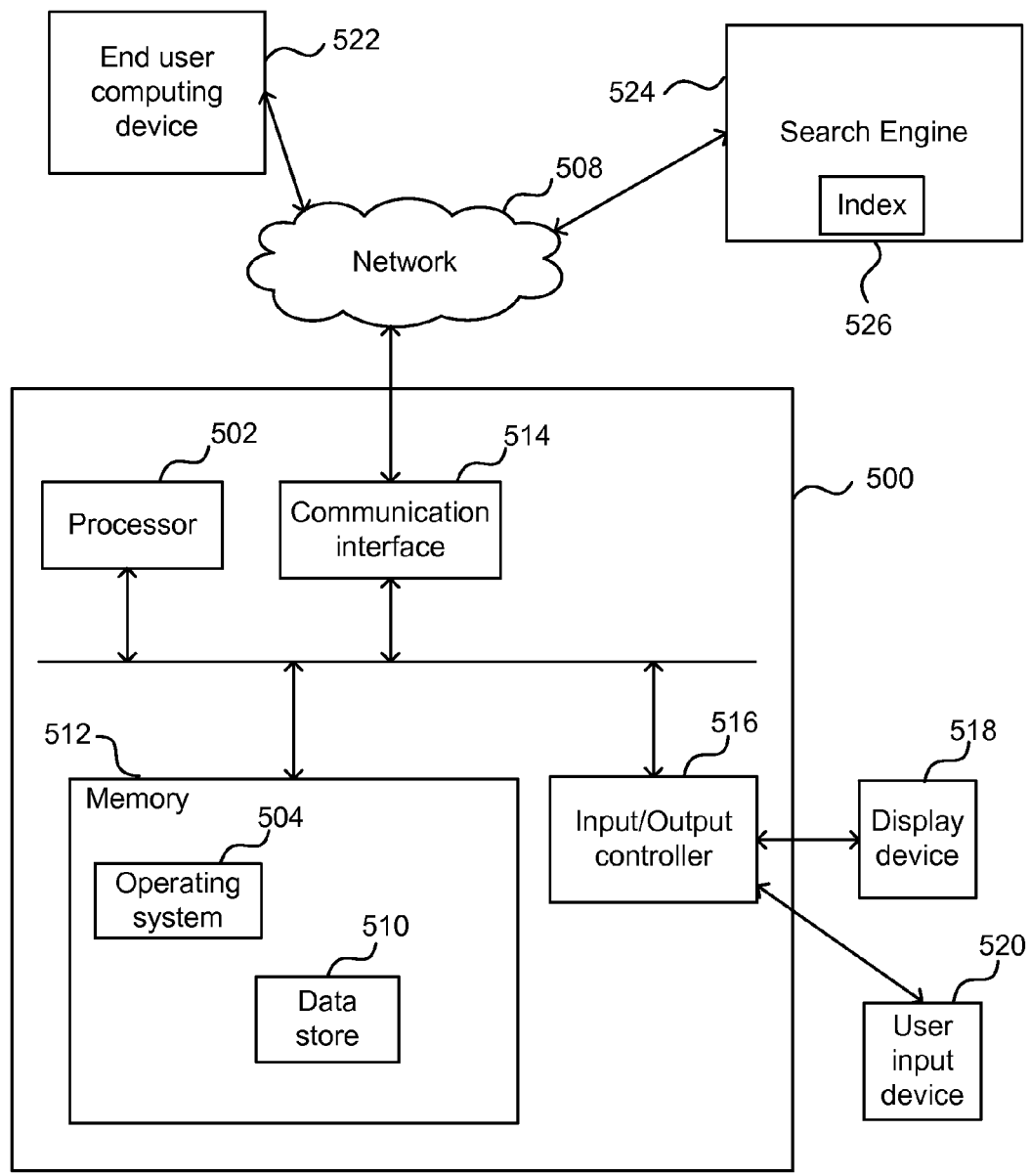
FIG. 5 illustrates a computing environment on which embodiments of methods presented herein may be implemented.

FIG. 5 illustrates various components of an exemplary computing-based device 500 which may be implemented as any form of a computing and/or electronic device, and in which embodiments of a method of selecting a query for multilingual/cross region search and merging the search results for a search engine 524 having an index 526 may be implemented.

The computing-based device 500 receives a query from an end user computing device 522, processes the query according to the embodiments explained herein and presents the search results to the user. The computing-based device 500 comprises one or more processors 502 which may be microprocessors, controllers or any other suitable type of processors for processing computer executable instructions to control the operation of the device 500. In some examples, for example where a system on a chip architecture is used, the processors 502 may include one or more fixed function blocks (also referred to as accelerators) which implement a part of the download method in hardware (rather than software or firmware). Platform software comprising an operating system 504 or any other suitable platform software may be provided at the computing-based device 500. A data store 510 is provided which may receive the query for processing it and presenting the search results to the user. The computing-based device 500, the end user computing device 522 and the search engine 524 are connected with each other via a network 508. Of course, the computing-based device 500 may also be considered to be part of the search engine 524.

The computer executable instructions may be provided using any computer storage media that is accessible by the computing-based device 500. Computer storage media may include, for example, computer storage media such as memory 512 and communications media. Computer storage media, such as memory 512, includes volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium is not to be interpreted to be a propagating signal per se. Propagated signals may be present in a computer storage media, but propagated signals per se are not examples of computer storage media.

The computing-based device 500 also comprises an input/output controller 516 arranged to output display information to a display device 518 which may be separate from or integral to the computing-based device 500. The display information may provide a graphical user interface. The input/output controller 516 is also arranged to receive and process input from one or more devices, such as a user input device 520 (e.g. a mouse, keyboard, camera, microphone or other sensor). Displays and keyboards may be connected through switches. In some examples the user input device 520 may detect voice input, user gestures or other user actions and may provide a natural user interface (NUI). This user input may be used to control the download method, to set parameter values, to view results and for other purposes. In an embodiment the display device 518 may also act as the user input device 520 if it is a touch sensitive display device. The input/output controller 516 may also output data to devices other than the display device, e.g. a locally connected printing device.

The input/output controller 516, display device 518 and optionally the user input device 520 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer storage medium. Examples of tangible storage media include computer storage devices comprising computer storage media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
    upon receiving a query, extracting features comprising language of the query, region of a user, both together called original language-region pair, and intent of the query, from the query;
    categorizing the intent of the query based on context of the query;
    receiving search results for the query for the original language-region pair;
    determining whether the query would benefit from issuing the query to another language-region pair based at least in part on the categorized intent and the features extracted from the query; and
    either:
        in response to determining that the query would benefit from being issued to another language-region pair:
            selecting another language-region pair;
            issuing the query to the other language-region pair;
            receiving search results for the other language-region pair;
            merging the search results for the original language-region pair with search results for the other language-region pair; and
            sending to end user equipment the merged search results; or
        in response to determining that the query would not benefit from being issued to another language-region pair, sending to end user equipment the search results for the query for the original language-region pair.

2. The method of claim 1, wherein determining whether the query would benefit from being issued to another language-region pair is performed concurrently with or subsequently to receiving search results for the query for the original language-region pair.

3. The method of claim 1, wherein receiving search results for the query for the original language-region pair comprises issuing the query to a ranker for the original language-region pair.

4. The method of claim 1, wherein receiving search results for the other language-region pair further comprises issuing the query to a ranker for the other language-region pair.

5. The method of claim 4, wherein the ranker for the original language-region pair is trained on the original language-region pair and the ranker for the other language-region pair is trained on the other language-region pair.

6. The method of claim 4, wherein a global ranker is used that takes location and language as inputs and ranks search results accordingly.

7. The method of claim 1, further comprising, after selecting another language-region pair, formulating a new query in the language of the other language-region pair, if the language of the other language-region pair differs from the language of the original language-region pair.

8. The method of claim 7, wherein formulating a new query in the language of the other language-region pair comprises translating the query into the other language of the other language-region pair while preserving the categorized intent of the query or projecting the query to a semantic space and finding the nearest corresponding query from the other language.

9. The method of claim 1, wherein determining whether the query would benefit from being issued to another language-region pair comprises analyzing signals to determine whether the probability of a user wanting the result from a given language-region pair is high.

10. The method of claim 9, wherein the signals are click through rates of the user.

11. The method of claim 1, wherein the categorized intent indicates for a given language-region pair and a given categorized intent at least a further language-region pair providing relevant content.

12. The method of claim 1, wherein determining whether the query would benefit from being issued to another language-region pair depends at least in part on whether the language of the query is a content poor language regarding the intent of the query.

13. The method of claim 1, wherein the extracted features are query and/or user related features.

14. The method of claim 13, wherein the extracted features further comprise at least one of spelling of the query and linguistic profile of the user.

15. The method of claim 1, wherein the language of the query and intent of the query are determined by query understanding techniques, while the user region is determined by a reverse IP lookup or GPS localization techniques.

16. The method of claim 1, wherein merging the search results for the original language-region pair with the search results for the other language-region pair comprises using a result merger which merges the results based on a learned probabilistic model that estimates a relevance gain from inserting a ranked result.

17. The method of claim 1, wherein presenting the merged search results to the user comprises in response to presenting a search result in a language different to the language of the original query, offering the user the possibility of translating the search result into the original language of the query.

18. One or more computer storage media comprising computer-executable instructions stored thereon which, when executed by one or more processors, cause the one or more processors to perform a computer-implemented method comprising:

upon receiving a query, extracting features comprising language of the query, region of a user, both together called original language-region pair, and intent of the query, from the query;

categorizing the intent of the query based on context of the query;

receiving search results for the query for the original language-region pair;

determining whether the query would benefit from being issued to another language-region pair based on the categorized intent and the features extracted from the query; and either:
  in response to determining that the query would benefit from being issued to another language-region pair:
    selecting another language-region pair;
    sending the query to the selected language-region pair;
    receiving search results for the selected language-region pair;
    merging the search results for the original language-region pair with search results for the selected language-region pair; and
    sending to end user equipment the merged search results; or
  in response to determining that the query would not benefit from being issued to another language-region pair, sending to end user equipment the search results for the query for the original language-region pair.

19. The one or more computer storage media of claim 18, wherein receiving search results for the query for the original language-region pair comprises issuing the query to a ranker for the original language-region pair.

20. An information retrieval system, comprising:
at least one hardware processor arranged to control:
  a query understanding component arranged to determine intent of a query;
  a region identifier arranged to determine a region of a user asking the query;
  a language classifier arranged to determine a language of the query;
  an intent classifier arranged to determine the intent of the query;
  a categorizer arranged to categorize the intent of the query based on context of the query;
  a categorizer based content profile that allows to determine whether the query would benefit from being issued to another language-region pair; a first ranking algorithm component arranged to rank search results according to the region of the user and language of the query;
  a second ranking algorithm component arranged to rank search results according to another language-region pair; and
  a merging component arranged to merge the search results according to the region of the user and the language of the query with the search results according to the other language-region pair.

* * * * *